(12) United States Patent
Renvall et al.

(10) Patent No.: US 10,654,687 B2
(45) Date of Patent: May 19, 2020

(54) PULLEY WHEEL RACK

(71) Applicant: KONE Corporation, Helsinki (FI)

(72) Inventors: Jani Renvall, Helsinki (FI); Antti Koskinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 271 days.

(21) Appl. No.: 15/664,460

(22) Filed: Jul. 31, 2017

(65) Prior Publication Data
US 2018/0029831 A1    Feb. 1, 2018

(30) Foreign Application Priority Data

Aug. 1, 2016 (EP) ..................................... 16182213

(51) Int. Cl.
| | | |
|---|---|---|
| *B66B 15/02* | (2006.01) | |
| *F16H 55/52* | (2006.01) | |
| *F16C 11/06* | (2006.01) | |
| *F16M 13/02* | (2006.01) | |
| *B66B 9/00* | (2006.01) | |
| *B66B 15/04* | (2006.01) | |

(52) U.S. Cl.
CPC .............. *B66B 15/02* (2013.01); *F16C 11/06* (2013.01); *F16H 55/52* (2013.01); *F16M 13/02* (2013.01); *B66B 9/00* (2013.01); *B66B 15/04* (2013.01)

(58) Field of Classification Search
CPC ....... B66B 15/02; B66B 15/04; B66B 11/008; B66B 11/08; B66B 9/00
See application file for complete search history.

(56) References Cited

U.S. PATENT DOCUMENTS

| 2,279,887 | A | * | 4/1942 | Hathorn | ................... F16H 55/50 |
| | | | | | 254/398 |
| 4,490,936 | A | * | 1/1985 | Svendsen | ................ A01K 73/06 |
| | | | | | 43/8 |
| 5,076,398 | A | * | 12/1991 | Heikkinen | .............. B66B 11/08 |
| | | | | | 187/266 |
| 6,364,063 | B1 | * | 4/2002 | Aulanko | ............... B66B 11/008 |
| | | | | | 187/251 |

(Continued)

FOREIGN PATENT DOCUMENTS

| JP | 2010-275022 A | 12/2010 |
| JP | 2011-051720 A | 3/2011 |
| JP | 2014-218321 A | 11/2014 |

OTHER PUBLICATIONS

Search Report issued in European Patent Application No. 16182213.5, dated Mar. 1, 2017.

*Primary Examiner* — Michael E Gallion
(74) *Attorney, Agent, or Firm* — Birch, Stewart, Kolasch & Birch, LLP (57) ABSTRACT

A pulley wheel rack includes a first rack part and a second rack part; a pulley wheel space between the first rack part and the second rack part; a first frame arranged to the first rack part, and a second frame arranged to the second rack part; an axle configured to extend from the first frame to the second frame, and configured to be rotatable into different securable positions by a ball joint arranged into the first frame and the second frame; and a pulley wheel bearing-mounted on the axle by hub bearings, and including at least one traction surface for engaging an elevator rope. A method for aligning a pulley wheel in a pulley wheel rack is also disclosed.

19 Claims, 5 Drawing Sheets

(56) References Cited

U.S. PATENT DOCUMENTS

| | | | | |
|---|---|---|---|---|
| 6,523,806 | B2* | 2/2003 | Bartal | B66D 1/00 |
| | | | | 254/272 |
| 7,585,238 | B2* | 9/2009 | Ducoulombier | A01D 43/105 |
| | | | | 198/617 |
| 7,753,345 | B2* | 7/2010 | Arzberger | B66D 1/365 |
| | | | | 254/329 |
| 8,257,210 | B2* | 9/2012 | Fujiwara | F16D 41/061 |
| | | | | 192/56.54 |
| 8,657,261 | B2* | 2/2014 | Mehrkens | A63C 11/10 |
| | | | | 254/323 |
| 9,783,399 | B2* | 10/2017 | Hausladen | B66D 1/30 |
| 9,902,593 | B2* | 2/2018 | Barneman | B66B 5/04 |
| 10,173,870 | B1* | 1/2019 | Hall | B66D 1/39 |
| 2005/0056819 | A1* | 3/2005 | Pockl | B66D 1/365 |
| | | | | 254/277 |
| 2008/0006802 | A1* | 1/2008 | Pesnel | B66D 3/04 |
| | | | | 254/226 |
| 2013/0193689 | A1* | 8/2013 | Grassi | B66D 1/7405 |
| | | | | 290/53 |

* cited by examiner

— PULLEY WHEEL RACK

TECHNICAL FIELD

The present disclosure relates to a pulley wheel rack and a method for adjusting the alignment of a pulley wheel. Particularly, the pulley wheel rack and the method are intended for elevators, for example elevators meant for transporting passengers and/or goods.

BACKGROUND OF THE INVENTION

An elevator typically comprises an elevator shaft into which an elevator car and/or a counterweight are arranged vertically movable, a driving unit with which the elevator car is moved. The driving unit may comprise a motor and a driven rope wheel engaging elevator suspension or hoisting roping. The roping is arranged between elevator car and the counterweight. The driving force of the motor is transmitted to the car via the driven rope wheel.

In addition, there may be one or more stationary pulley wheels, mounted in the proximity of the upper end of the elevator shaft, for guiding and aligning the suspension roping along the vertical direction of the elevator shaft. In some cases, there may also be additional second roping between the elevator car and the counterweight, suspended to hang from the elevator car and the counterweight, to provide compensation for the weight of the suspension roping. The second roping may also provide a lock-down function. The second roping may be tensioned to pass around one or more second pulley wheels mounted stationary in a position below the elevator car and the counterweight, typically in the lower end of the elevator shaft.

A pulley wheel may be mounted in a pulley wheel space delimited by two supporting walls formed by a pulley wheel rack or frame. The pulley wheel is supported on the rack via an axle with two ends, one end being supported by one supporting wall and the other by the other supporting wall. The pulley wheel rack may be fixedly mounded on a suitable space, typically inside the upper end of the elevator shaft or inside a machine room of the elevator, above or adjacent to the elevator shaft. The pulley wheel rack may for example be mounted on the motor bedplate. One or more of the pulley wheels may be the driven rope wheel.

The elevator rope or ropes must be carefully aligned and guided between consecutive pulley wheels to ensure that the rope does not twist excessively when travelling from one pulley wheel to another, and that the rope arrives at and departs from the traction surface of a pulley wheel at least substantially tangentially. Typically, this alignment operation is done by adjusting the position of the pulley wheel rack by adjusting screws, or by shimming plates. With screws, the midpoint of the pulley wheel may easily move away from its initial position. With shimming plates, the pulley wheel may have to be raised several times until a proper position is achieved, which is not only time consuming but also involves heavy lifting work.

Aligning the elevator ropes by aligning the pulley wheels may be an extensive operation for technicians responsible for the installation and/or maintenance of an elevator. Especially in installations where several pulley wheels must be aligned, each one in both tilt and toe directions, i.e. in camber and caster, so that the rope is guided to move in the middle of the traction surface of the pulley wheel. The aligning must be done with great care, since an inadequately aligned rope may run asymmetrically causing the rope to wear in an unexpected and wrong way. The rope may even move away from the traction surface during operation of the elevator. The alignment must be done every time one or more of the ropes are changed, or when other maintenance work is performed that would affect the roping of the elevator.

SUMMARY OF THE INVENTION

An object of the present invention is to provide an improved pulley wheel rack and a method for adjusting the alignment of a pulley wheel. The invention is in particular, but not only, intended for elevators, especially for passenger or freight elevators in buildings of different height. However, the invention may also be used in connection with other pulley wheels as well.

The pulley wheel rack according to the present disclosure is characterized by comprising a first rack part and a second rack part; a pulley wheel space between the first rack part and the second rack part; a first frame arranged to the first rack part, and a second frame arranged to the second rack part; an axle configured to extend from the first frame to the second frame, and configured to be rotatable into different securable positions by a ball joint arranged into the first frame and the second frame; and a pulley wheel, bearing-mounted on the axle by hub bearings, and comprising at least one traction surface for engaging an elevator rope.

In one embodiment of the invention, the first frame and the second frame both comprise a tightener configured to secure the axle into a position.

In one embodiment of the invention, the tightener is releasable so that in a released state, the axle is rotatably movable, and in a fixed state, the axle is a stationary axle.

In one embodiment of the invention, a form-lock is created between a first axle shoulder and the ball part of the first frame, and between a second axle shoulder and the ball part of the second frame when the tightener is configured into the fixed state.

In one embodiment of the invention, the ball joint comprises a ball part, a ball rack and a sliding surface between the ball part and the ball rack.

In one embodiment of the invention, the sliding surface of the ball joint arranged into the first frame and the sliding surface of the ball joint arranged into the second frame are configured to form spherical caps of a theoretical sphere whose centre point is the centre point of the axle.

In one embodiment of the invention, the axle is rotatably movable via the sliding surface along a three-dimensional path defined by the theoretical sphere and by the diameter of a first opening of the first frame and a second opening of the second frame.

In an embodiment of the invention, the first frame and the second frame both comprise at least one adjuster configured to be in contact with the axle.

In an embodiment of the invention, the first frame and the second frame both comprise at least one vertical adjuster for adjusting a tilt angle of the axle, and at least one horizontal adjuster for adjusting a toe angle of the axle.

In an embodiment of the invention, the adjusters are arranged onto or into the ball rack.

In another aspect of the invention there is disclosed a method for aligning a pulley wheel in a pulley wheel rack according to the invention. The method comprises arranging the pulley wheel axle to extend from the first frame to the second frame; arranging a ball joint and a tightener into the first frame and the second frame; rotating the axle with the ball joint into a desired position along a three-dimensional path to a desired position; and securing the axle into the desired position with the tightener.

In one embodiment of the invention, the tilt angle is adjusted by moving the axle in the direction of an axis z with at least one vertical adjuster arranged to the first frame and/or to the second frame, the axis z corresponding the vertical.

In one embodiment of the invention, the toe angle is adjusted by moving the axle in the direction of an axis y with at least one horizontal adjuster arranged to the first frame and/or to the second frame, the axis y corresponding to a direction in plane with and perpendicular to the horizontal.

In one embodiment of the invention, the maximum tilt angle and/or toe angle is defined by diameter of openings of the first frame and the second frame.

In yet another aspect of the invention, there is disclosed an elevator comprising at least one pulley wheel in a pulley wheel rack according to the invention.

The invention according to the present disclosure offers specific advantages over prior art.

The aligning time of pulley wheels may be significantly decreased compared to the solutions typically employed, such as shimming. Once the pulley wheel has been installed in place, there is no need to lift the wheel or the wheel rack to find an optimal position—thus the need for heavy lifting work and potentially dangerous moving of heavy objects is minimized.

The adjusting may be done more accurately as the centre point or middle point of the pulley wheel axis is not affected contrary to the current solution of adjusting the alignment with screws. Therefore it is easier to control the tilt and toe angles during the aligning operation. The position of the pulley wheel rack does not move in relation to the ground during the alignment of tilt and toe angles.

BRIEF DESCRIPTION OF DRAWINGS

The accompanying drawings, which are included to provide a further understanding of the invention, and which constitute a part of this specification, illustrate embodiments of the invention. Together with the description the drawings are meant to help to explain the principles of the invention. The invention is not limited to the specific embodiments illustrated in the drawings.

In the drawings:

FIG. 2b presents an enlargement of area A in FIG. 2a, FIG. 3 presents a schematic three-dimensional view of a pulley wheel rack according to another embodiment of the invention.

DETAILED DESCRIPTION OF THE EMBODIMENTS

In the following, certain directional definitions are used to describe the invention in detail. A three-dimensional Cartesian coordinate system is utilised to illustrate the different directions, i.e. an ordered triplet of lines or axes that are pair-wise perpendicular and have an orientation for each axis have been chosen. In relation to a common origin, each of the three axes have a positive (+) direction and a negative (−) direction.

In the figures, for axis z, the positive direction is interpreted as "upwards" and the negative direction as "downwards" when viewing the invention from a front view; for axis x, the positive direction is "right" and the negative direction "left" (in two-dimensional presentations) in the same viewing direction; and for the axis z, positive direction is interpreted as "forward", or towards the viewer, and the negative direction is "backward", i.e. away from the viewer.

Further, axis z corresponds to vertical; axis x corresponds to horizontal and is perpendicular to axis z; and axis y corresponds to a third direction, in plane with and perpendicular to axis x. In effect, axis y can be interpreted as depicting depth in relation to the surface of the drawing pages.

By "front view" herein is meant a view as from regarding the invention from the negative direction of axis y. By "top view" herein is meant a view in the direction of axis z, more specifically in the downwards-projecting direction or negative direction of the z axis.

Some of the figures presented with this disclosure have all or some of the three coordinates identified in relation to the detailed structure of the invention, to clarify the directions in those particular embodiments.

By tilt angle $\alpha$ herein is meant the angle of deviation from axis x in the positive or negative direction of axis z (or the angle of deviation from axis z in the positive or negative direction of axis x), i.e. the deviation of a pulley wheel axle 11 from the horizontal (or the deviation of a pulley wheel centre line W from the vertical).

By toe angle $\beta$ here in is meant the angle of deviation from axis x in positive or negative direction of axis y (or the angle of deviation from axis y in the positive or negative direction of axis x), i.e. the deviation of the pulley wheel axle 11 from the third direction.

In the following, a pulley wheel arrangement 1 according to the invention is described in connection with FIGS. 1, 2a-b, 3 and 4a-c.

The pulley wheel arrangement 1 comprises a first rack part 1a and a second rack part 1b, spaced apart so that a pulley wheel space 2 is created between the first rack part 1a and the second rack part 1b. The first rack part 1a and the second rack part 1b are mirror images of each other, and they together they form a rack on which a pulley wheel 10 may be mounted. The first and second rack part 1a, 1b may, for example be, U beams or I beams or the like manufactured from metal such as steel, or any other suitable material.

The first rack part 1a comprises a first frame 20a, and the second rack part 1b comprises a second frame 20b. The first frame 20a and the second frame 20b are arranged onto or into the first and second rack parts 1a, 1b. The pulley wheel 10 is arranged onto an axle 11. The pulley wheel 10 is bearing-mounted onto the axle 11 with bearings 13. The axle 11 extends from the first rack part 1a to the second rack part 1b, more specifically from the first frame 20a to the second frame. The pulley wheel 10 is thus mounted on the rack 1 via its axle 11. The pulley wheel 10 has a centre line W, which is the rotational plane W of the pulley wheel 10, in relation to which the two parts 1a, 1b and the two frames 20a, 20b are arranged as mirror images of each other.

Both frames 20a, 20b comprise the same structural details and components, arranged on an imaginary horizontal line on axis x in a specific order so that one component follows another and so that each component has a relative distance from the pulley wheel centre line W. The components of the first frame 20a are arranged in an order extending from the pulley wheel centre line W into one (positive) direction of the axis x, while the components of the second frame 20b are arranged in an order extending from the centre line W into another (negative) direction of the axis x.

The different components may also be understood to have sides either closer to or further away from the centre line W, as will be described herein. The side closer to, or facing, the centre line W is referred to as the inner side, and the side further away from, or facing away from, the centre line W is referred to as the outer side.

For the sake of conciseness, only one of the frames 20a, 20b will be described in detail, but it is to be understood that both frames 20a, 20b comprise the same components even though they are described in detail mostly in connection with the first frame 20a, and are mainly shown in the figures in connection with the first frame 20a.

The axle 11 is a static axle and the pulley wheel 10 is arranged to rotate about the axle 11 via hub bearings 13. The axle 11 has a longitudinal axis 110 which needs to be aligned in both tilt and toe in order to ensure that the elevator roping arranged to run around the pulley wheel 10 is properly aligned as well. The pulley wheel 10 has at least one traction surface 12 for engaging the roping comprising one or more ropes (not shown in the figures). The number of the traction surfaces 12 depends on the number of ropes.

The pulley wheel 10 may be any type of a pulley wheel utilised in connection with different types of elevator ropes. The elevator ropes may be for example uncoated steel wire or cable; coated wire or cable wherein the coating may comprise polymer; or belt such as a cogged belt, or a grooved belt with vertical grooves (grooves in the longitudinal direction of the rope or belt) for guiding the belt in the vertical direction. A belt is by definition a rope which has a width larger than the thickness of the rope as viewed in the transverse direction of the rope, where as a wire or cable may have an essentially round cross-section. The type of elevator rope is not limiting to the pulley wheel rack 1, and the pulley wheel rack 1 is also suitable for any kind of pulley wheels. The type and material of the traction surface 12 may be selected according to a specific rope type.

The pulley wheel 10 is supported on the first rack part 1a and the second rack part 1b via the axle 11, configured to extend substantially horizontally, or along axis x, at a first axle end 11a from the first frame 20a to the second frame 20b at a second axle end 11b. More specifically, the axle 11 is arranged to extend through the first frame 20a of the pulley wheel rack 1 via a first opening 220a and through the second frame 20b via a second opening 220b. The openings 220a, 220b may be circular holes with a suitable diameter.

The axle 11 comprises a first axle shoulder 112a, arranged at a point between an axle centre point 201 and a first axle head 113a; and a second axle shoulder 112b, arranged at a point between the axle centre point 201 and a second axle head 113b. In an embodiment, between the axle heads 110a, 110b and the axle shoulders 112a, 112b, the axle ends 11a, 11b may be threaded, the threading starting from the axle shoulders 112a, 112b, and extending all the way to the axle heads 113a, 113b of the axle 11. In one embodiment, the threading may extend from the axle heads 113a, 113b towards the axle shoulders 112a, 112b for at least a part of the length of the axle ends 11a, 11b.

The frames 20a, 20b both comprise the following components, listed here in order from the component closest to the pulley wheel centre line W to the component farthest to the pulley wheel centre line W: a ball part 21, a ball rack 22, a ball washer 24, a second washer 25, and, lastly, a tightener 30, each individual component arranged adjacent and engageably to its neighbouring component or components. Each individual component may be brought into contact with the neighbouring component or components. Each individual component may be so formed as to fit the form of the neighbouring component or components.

The ball part 21 is arranged to extend around the pulley wheel axle 11, i.e. the pulley wheel axle end 11a is arranged to extend through an opening in the ball part 21. The opening is configured so as to fit the axle shoulders 112a, 112b extending into the ball part 21 openings, and retain the axle shoulders 112a, 112b, as can be seen in FIGS. 2b and 4c, so that the axle 11 is immovably arranged in relation to the ball part 21 within the frames 20a, 20b. The ball part 21 is the part of the frames 20a, 20b located closest to the pulley wheel 10 and its centre line W.

The ball rack 22 is configured to engage the ball part 21. The ball rack 22 comprises the opening 220a for the axle 11. The ball rack 22 has a concave inner surface 212. The ball rack 22 may additionally have a convex outer surface (i.e. the surface that is farthest from the pulley wheel centre line W).

The ball part 21 has a convex outer surface 210 (i.e. the surface furthest from the pulley wheel centre line W), and the outer surface 210 of the ball part 21 is so convex as to create a convex sliding surface 23 between the outer surface of the ball part 21 and the inner surface 212 of the ball rack 22.

The sliding surface 23 of the first frame 20a forms a part of a theoretical sphere 200, i.e. the sliding surface 23 is a spherical calotte or cap of the theoretical sphere 200. A similar sliding surface created between the outer surface of the ball part and the inner surface of the ball rack of the second frame 20b, which both are identical but mirror images of the corresponding components of the first frame 20b, as explained before.

In other words, the convex outer surfaces of the ball parts 21 of both of the frames 20a, 20b make up a part of the shell of the theoretical sphere 200.

The ball part 21, the ball rack 22 and the sliding surface 23 therebetween form a ball-and-socket joint or ball joint with which the axle 11 may be rotatably moved and aligned into different positions along a three-dimensional axis. Further, the axle 11 may be securable to the desired positions by the tightener 30. By securing the ball part 21 and the ball rack 22 by the tightener 30, the sliding surface 23 is eliminated by forming a form-lock may be created between the ball part 21 and the ball rack 22. In an embodiment, additionally or alternatively, the sliding surface 23 may be eliminated by friction created between the ball part 21 and the ball rack 22 by tightening the tightener 30.

Thus the first frame 20a and the second frame 20b together create the theoretical sphere 200 that has a centre point, which is the centre point 201 of the pulley wheel axle 11. In a manner of speaking, the frames 20a, 20b act as a partial ball bearing or ball joint allowing three-dimensional movement of the axle 11 and thus the alignment of the pulley wheel 10, as will be discussed in more detail later on in this disclosure.

In order to achieve the correct distance of the convex surfaces of the ball parts 21 from the centre point 201 of the pulley wheel axle 11, i.e. to create the correct shape to the theoretical sphere 200, the axle shoulders 112a, 112b are arranged to extend a specific length into the ball parts 21. This length will naturally depend on the dimensions of the pulley wheel rack 1, the pulley wheel 10 and the pulley wheel axle 11, all of which will depend on the type of roping and the configuration and type of elevator in which the pulley wheels are installed.

The ball rack 22 has a concave inner surface (i.e. the surface that is closer to the pulley wheel 10). The outer surface 210 of the ball part 21 and the inner surface 212 of the ball rack 22 are arranged into contact with each other so that between the outer surface 210 of the ball part 21 and the inner surface 212 of the ball rack 22, a convex sliding surface 23 is created. The sliding surface 23 allows movement of the axle 11.

The axle 11 may be moved axially (in horizontal direction) to align it in the centre of the pulley wheel space 2, and to remove the axle 11 from the frames 20a, 20b when necessary, when at least one of the two tighteners 30 is completely released or removed from the frame 20a or 20b. Further, the axle 11 may be moved radially in relation to the theoretical sphere 200 (i.e. in the three-dimensional space created by the x, y and z axes) by sliding the axle 11 along the sliding surface 23 as far as the size or diameter of the openings 220a, 220b allow.

In an embodiment, if the diameter of the axle 11 is large enough, the ball part 21 may be integrated into the axle 11 so that the axle 11 itself functions as the ball part 21. In this case, the ball part 21 functions similarly to a separate ball part 21, as explained herein.

The ball part 21 and the ball rack 22 may be manufactured from material that inherently allows smooth sliding, or a lubricant medium may be utilised to allow the sliding. The ball part 21 and the ball rack may for example be manufactured from metal such as stainless steel by casting. The contacting surfaces may be further smoothed and polished. The manufacturing method may, for example, be computer controlled manufacturing such as CNC (computer numerical control) machining or additive manufacturing.

Further, the frame 20a, 20b comprise a ball washer 24 configured to bring the ball rack 22 against the ball part 21 to create the sliding surface 23. For example, the ball washer 24 may be a nut configured to be turned along the threaded end parts 11a, 11b of the pulley wheel axle 11. The inner surface (i.e. the surface closest to the pulley wheel) of the ball washer 24 may be concave so that the ball washer 24 may form a secure connection with the convex outer surface of the ball rack 22. The ball washer 24 may have a straight outer surface (i.e. the surface farthest from the pulley wheel 10) for creating a plane for a second washer 26.

The second washer 26 may be a simple round, square or hexagonal washer or sealing ring with straight or plane inner and outer (in relation to the pulley wheel centre line W) surfaces, arranged around the axle ends 11a, 11b. In addition, the frames 20a, 20b comprise the separate tightener 30 which may be used to secure the different parts of the frames 20a, 20b in place once the alignment of the pulley wheel 10 is finished. In other word, the tightener 30 is used to secure the axle 11 immovable in relation to the rack parts 1a, 1b once the desired position is achieved. Once secured, the axle 11 is a dead axle, and the pulley wheel rotates via bearings 13 in relation to the axle 11.

The tightener 30 may, for example, be a nut configured to be turned along the treaded axle ends 11a, 11b to fix the parts in place by friction force. The tightener 30 secures the ball-and-socket joint comprising the ball part 21, the ball rack 22 and the sliding surface 23 therebetween fixedly in place so that the axle 11 may not move. By securing herein is meant attaching in a manner that is non-permanent, i.e. so the secured or fixed connection between the different parts of the frames 20a, 20b may be reopened by opening or releasing the tightener from its fixing or securing position.

For influencing the alignment of the pulley wheel 10, the frames 20a, 20b comprise adjusters 41, 42 (best shown in FIG. 1) configured to be in contact with the pulley wheel axle 11. The contact may take place for example via the ball washers 24.

The adjusters 41, 42 may be arranged onto or into the ball rack 22. In an embodiment (see FIGS. 1, 2b), the ball rack 22 may comprise an annular flange 221 extending outwards in the direction of axis x, the flange 221 comprising adjusters 41, 42 extending from the flange 22 to the ball washer 24. The flange 221 may comprise at least one vertical adjuster 41 for adjusting the tilt angle of the pulley wheel 10, and at least one horizontal adjuster 42 for adjusting the toe angle of the pulley wheel 10. In an embodiment, there are two vertical adjusters 41 and two horizontal adjusters 42 to ensure preciseness of the aligning operation.

In an embodiment, the adjusters 41, 42 may be arranged to contact directly the axle 11. In an embodiment, the adjusters 41, 42 may be arranged to contact the ball part 21 and thus influence the axle 11. In an embodiment, the adjusters 41, 42 may be arranged to contact the tightener 30 and influence the axle 11 via the tightener 30. In yet another embodiment, the adjusters 41, 42 may be arranged to contact the pulley wheel 10 and influence the axle 11 via the pulley wheel 10. The adjusters 41 may also be arranged into several different positions of those listed above, and thus influence the axle 11 directly and/or via several different structural parts.

Further, the adjusters 41, 42 may be configured into the pulley wheel arrangement 1 as a separate, that is to say, removable, tool. In case the pulley wheel needs to be adjusted less frequently, it may be more feasible to utilise a separate tool instead of adjusters 41, 42 arranged specifically into the structure of the pulley wheel arrangement 1. In FIGS. 3, 4a-c, an embodiment where there are no adjusters 41, 42 as such, but a separate specific tool may be utilised for the adjustment of the pulley wheel alignment. The tool, however, functions similarly to the adjusters 41, 42, i.e. with the tool it is possible to influence the alignment of the axle 11 as described herein in context with the adjusters 41, 42.

The adjusters 41, 42 may, for example be threaded rods or screws that can be turned in openings or holes, comprising a corresponding female thread, and arranged into the flange 22 so that the turning of the rods or screws force the axle 11 via the ball washer 24 to the desired direction. The screws may be used to pull or push the ball washer 24. In one embodiment, there may be two vertical adjusters 41 and two horizontal adjusters 42. In an embodiment, the adjusters 41, 42 may also be eccentric adjusters so that the axle 11 is moved by one or more eccentric rings.

The size or diameter of the opening 220, arranged into the ball rack 22, defines the maximum angles for which the axle 11 may be adjusted. Also the size (diameter) of the axle 11 naturally affects the maximum angle. The relationship between the diameter of the opening 220 and the diameter of the axle 11 depends on the distance of the ball rack 22 from the centre point 201 of the axle 11. The suitable diameter of the opening 220 for any specific pulley wheel arrangement 1 may be defined as:

diameter of the opening 220=(distance of the ball rack 22 from the centre point 201)×tan(desired maximum angle)

Figure 1:
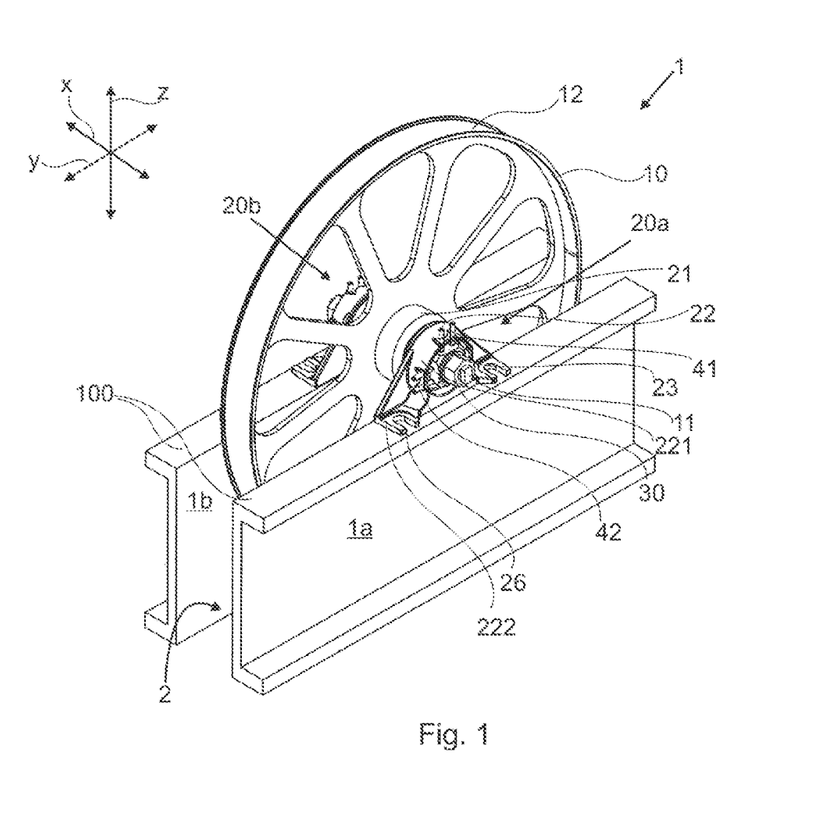
FIG. 1 presents a schematic three-dimensional view of a pulley wheel rack according to an embodiment.

The first frame 20a may be detachably or fixedly secured to the first rack part 1a, and the second frame 20b to the second rack part 1b, via mounting points 25 arranged into the ball rack 22, by using any suitable securing means such as screws, pins or bolts. The mounting points may, for example, be openings or holes arranged into an extension 222 of the ball rack 22 (FIG. 1). In an embodiment, the frames 20a, 20b may be secured onto a horizontal surface 100 of the first and second rack parts 1a, 1b of the pulley wheel arrangement 1. In another embodiment, the frames 20a, 20b may be arranged into an opening configured in the vertical wall surface 101 of the first and second rack parts 1a, 1b (FIG. 3) and secured in place with suitable securing means 26 via holes 25 arranged into the ball rack 22.

The two rack parts 1a, 1b of the pulley wheel arrangement 1 may be fixedly attached by suitable means such as screws, pins or bolts (not shown in figures) onto any suitable surface within an elevator, for example in a machine room of the elevator. The surface may, for example, be a motor bedplate.

In the following, the method for adjusting the alignment of a pulley wheel is explained in detail, in connection with FIGS. 2a and 3a.

The adjustment of alignment may take place for example during first installation of the elevator, or during changing of roping. Once the pulley wheel 10 with the roping arranged to run over the pulley wheel 10 is installed in place into the pulley wheel arrangement 1, between the first rack part 1a and the second rack part 1b by arranging the pulley wheel axle 11 between the first frame 20a and the second frame 20b, the alignment may be carried out.

The different parts of the frames 20a, 20b: the ball part 21, the ball rack 22, the washers 24, 25 and the tightener 30 are arranged in place in an order as explainer earlier in this disclosure so that the axle 11 is arranged through the opening of the ball part 21 and via the opening 220 through the ball rack 22. The washer 24 is brought towards the ball rack 22, for example by turning it along the threading of the axle ends 11a, 11b, so that the sliding surface 23 between the ball part 21 and the ball rack 22 may be created, and the adjusters 41, 42 of the ball rack 22 brought into connection with the washer 24. The second washer 25 is arranged between the ball washer 24 and the tightener 30.

Figure 2A:
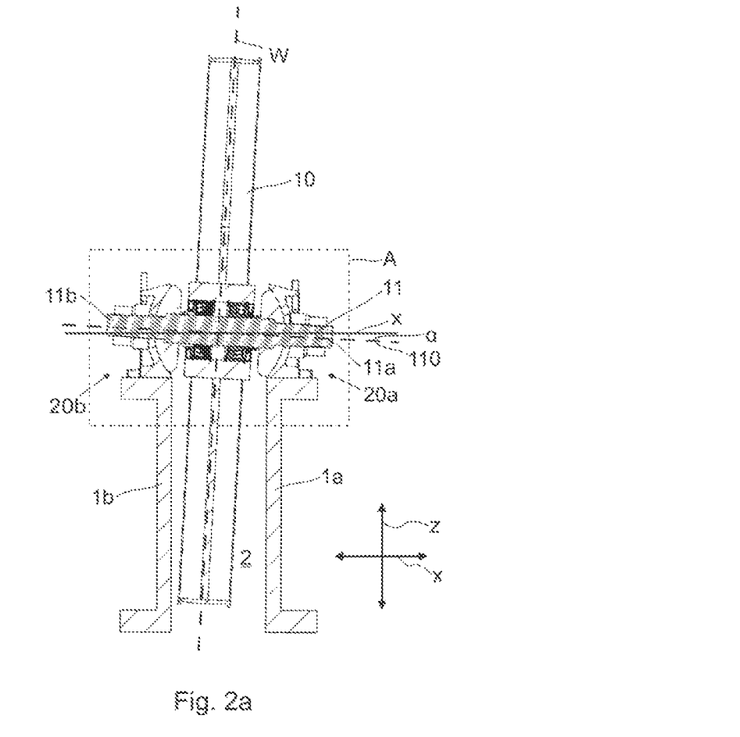
FIG. 2a presents a vertical cross-section of the pulley wheel rack in FIG. 1 in front view.
Figure 2B:
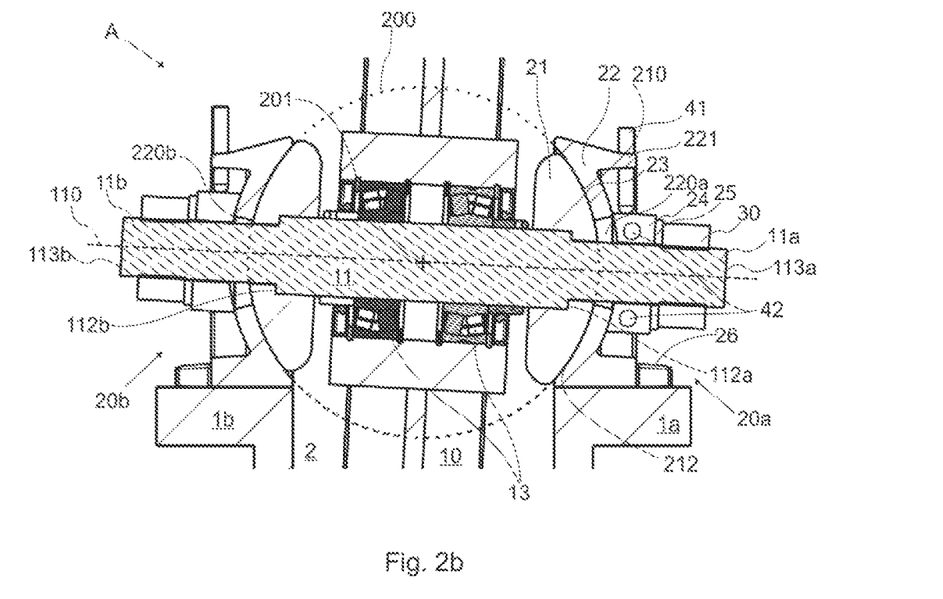
Figure 3:
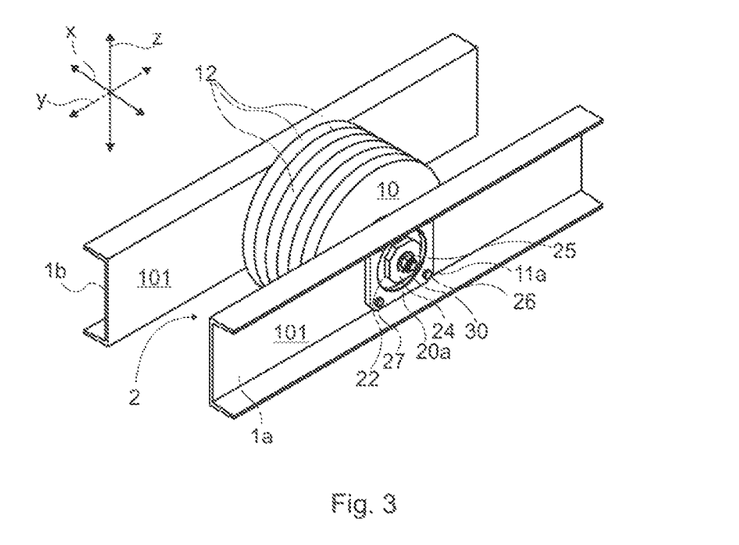

In order to adjust the tilt angle α of the pulley wheel, the washer 24 is forced to move the axle 11 in the direction of axis z or vertical with the vertical adjusters 41 (see FIG. 2a). In an embodiment, this may be done by moving the vertical adjuster 41 in the positive or negative direction of axis z. For example, this may be done by turning the vertical adjuster 41 which may be a threaded rod in a threaded hole arranged into the ball rack 22 of the frame 20a, 20b, as explained earlier. Controlling the vertical adjuster may be done separately on both frames 20a, 20b of the pulley wheel arrangement 1. There may be one or more vertical adjusters 41 arranged on each frame 20a, 20b, all of which may be controlled or moved independently of each other. In an embodiment, there are two vertical adjusters 41 arranged on each frame 20a, 20b. The sliding surface 23 allows the movement of the axle 11 at a desired angle, the maximum tilt angle α being defined by the diameter of the opening 220. The desired angle is the angle with which the axle 11 is aligned flush with the horizontal or axis x when viewing the pulley wheel rack 1 from the front (in the direction of axis y).

Figure 4A:
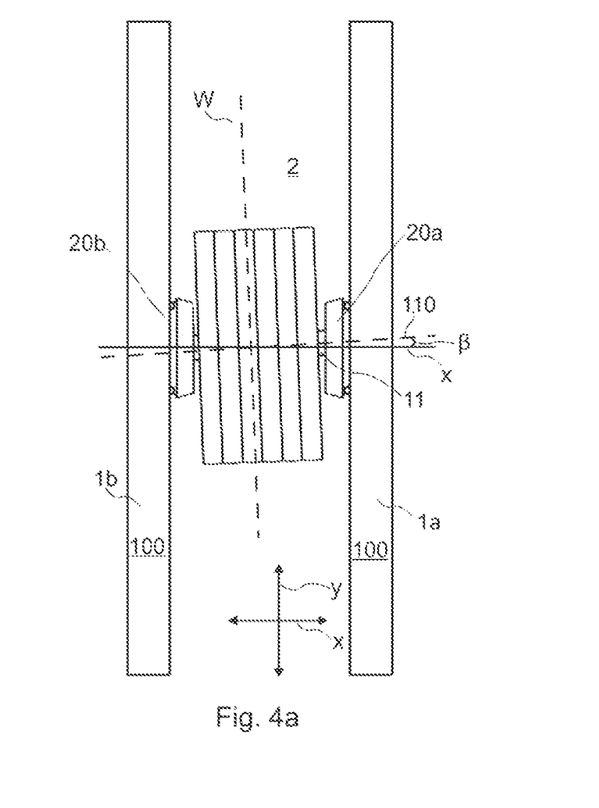
FIG. 4a presents a top view of the pulley wheel in FIG. 3.
Figure 4B:
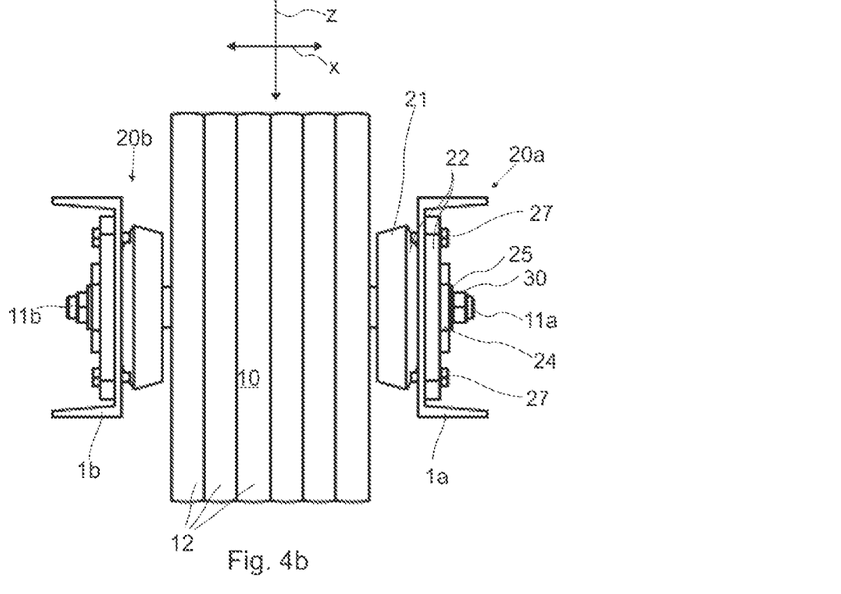
FIG. 4b presents a front view of the same.
Figure 4C:
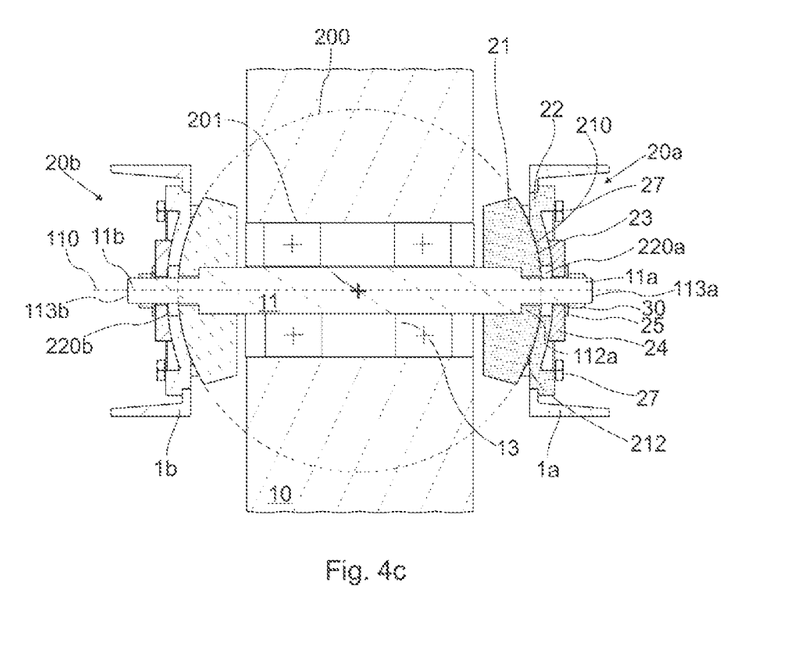
FIG. 4c presents a vertical cross-section of the same.

In order to adjust the toe angle β of the pulley wheel, the washer 24 is forced to move the axle 11 in the direction of axis y (the third direction) with the horizontal adjusters 42 (see FIG. 4a). In an embodiment, this may be done by moving the horizontal adjuster 42 in the positive or negative direction of axis y. For example, this may be done by turning the adjuster 42 which is a threaded rod inside a threaded hole arranged into the ball rack 22. Controlling the horizontal adjusters 42 may be done separately on both frames 20a, 20b of the pulley wheel arrangement 1. There may be one or more horizontal adjusters 42 arranged on each frame 20a, 20b, all of which may be controlled or moved independently of each other. In an embodiment, there are two horizontal adjusters 42 arranged on each frame 20a, 20b. The sliding surface 23 allows the movement of the axle 11 at a desired angle, the maximum toe angle β being defined by the diameter of the opening 220. The desired angle is the angle with which the axle 11 is aligned flush with axis x when viewing the pulley wheel rack from above (in direction of axis z).

In effect, the pulley wheel arrangement 1 allows three-dimensional adjusting movement which is radial in relation to the theoretical sphere 200, about two perpendicular axis:
1) rolling to align the pulley wheel axle 110 about axis y in ± direction of axis x, i.e. adjusting the tilt angle α or camber;
2) yawing to align the pulley wheel axle 110 about axis z in ± direction of axis x, i.e. adjusting the toe angle β or caster.

In a correct alignment, the pulley wheel axle 11 is aligned in the horizontal, and the pulley wheel centre line W aligned in the vertical. This ensures that the elevator roping runs in the middle of the traction surface 12 of the pulley wheel, that the roping does not twist excessively when travelling from one pulley wheel 10 to another, and that the roping arrives at and departs from the traction surface 12 of a pulley wheel 10 at least substantially tangentially, which may reduce the wearing of the roping.

Once a desired alignment has been achieved, the tightener 30 may be tightened so as to fix all the parts of the frame 20a, 20b: the ball part 21, the ball rack 22, the ball washer 24 and the second washer 25 together and securing them in place by friction force. This forces the outer surface of the ball part 21 and the inner surface of the ball rack 22 together tightly so that the sliding surface 23 is lost and the axle 11 may not anymore be moved even though the adjusters 41, 42 would for some reason be moved. In addition, a locked connection is created between the openings of the ball parts 21 and the axle shoulders 112a, 112b. In other words, the axle 11 is secured immovably to the pulley wheel rack 1 so that it is a stationary axle.

When the pulley wheel 10 needs to be further adjusted for tilt and toe angles, for example during changing the roping or other maintenance operations, the tightener 30 may be again loosened to allow the movement of the different parts of the frame 20a, 20b in relation to each other and the creation of the sliding surface 23 between the outer surface of the ball part 21 and the inner surface of the ball rack 22, so that the axle 11 may once again be moved with the adjusters 41, 42.

The method for adjusting the alignment of a pulley wheel 10 may be executed manually, i.e. by technician or technicians controlling the adjusters 41, 42 with suitable tools. Further, the use of a pulley wheel arrangement 1 as disclosed by the invention enables and/or facilitates fully or partially automated alignment of pulley wheels, for example with by executing the control of the adjusters 41, 42 with a computer-controlled system.

Figure 5:
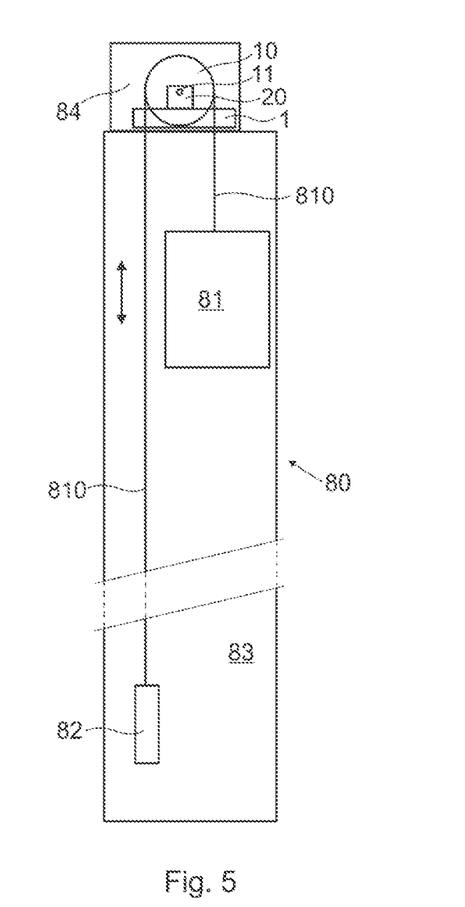
FIG. 5 presents a schematic illustration of an elevator according to an embodiment.

FIG. 5 illustrates an elevator 80 according to an embodiment of the invention. The elevator 80 comprises an elevator car 81 and a counterweight 82 arranged to be vertically movable in an elevator shaft 83. The elevator 80 further comprises a drive machine such as a motor (not shown) arranged into a machine room 84, and providing moving force for the elevator car 81 via a system of driven wheels and pulley wheels. The elevator car 81 is connected to at least one roping 810 which is arranged to pass and run over at least one pulley wheel 10 and extend to the counterweight 82 so that the elevator car 81 and the counterweight 82 are interconnected by the roping 810. The pulley wheel 10 is arranged onto a pulley wheel rack 1 so that the axle 11 of the pulley wheel 10 is arranged into a frame 20 of the pulley wheel rack 1. At least one of the pulley wheel arrangements 1 is a pulley wheel arrangement 1 according to the invention as described above.

The above embodiments are to be understood as illustrative examples of the invention. Further embodiments of the inventions can be conceived. It is to be understood that any feature described herein in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A pulley wheel rack comprising:
    a first rack part and a second rack part;
    a pulley wheel space between the first rack part and the second rack part;
    a first frame arranged to the first rack part, and a second frame arranged to the second rack part;
    a first ball joint provided by the first frame;
    an axle configured to extend from the first frame to the second frame, and configured to be rotatable into different securable positions by the first ball joint; and
    a pulley wheel bearing-mounted on the axle by hub bearings, and comprising at least one traction surface for engaging an elevator rope,
    wherein the first ball joint includes a first ball part and a first ball rack engaging the first ball part and surrounding the axle, the first ball rack comprising a first opening and a first adjuster inserted into the first opening to adjust a tilt angle of the axle.

2. The pulley wheel rack according to claim 1, wherein the first frame and the second frame both comprise a tightener configured to secure the axle into a position.

3. The pulley wheel rack according to claim 2, wherein the tightener is releasable so that in a released state, the axle is rotatably movable, and in a fixed state, the axle is a stationary axle.

4. The pulley wheel rack according to claim 3, further comprising a second ball joint provided by the second frame, wherein the second ball joint comprises a second ball part and a second ball rack, and wherein a form-lock is created between a first axle shoulder and the first ball part of the first ball joint provided by the first frame, and between a second axle shoulder and the second ball part of the second ball joint provided by the second frame when the tightener is configured into the fixed state.

5. The pulley wheel rack according to claim 1, further comprising a second ball joint provided by the second frame,
    wherein the second ball joint comprises a second ball part, a second ball rack engaging the second ball part and surrounding the axle, and a second sliding surface between the second ball part and the second ball rack, wherein the second ball rack comprising a second opening and a second adjuster inserted into the second opening to adjust the tilt angle of the axle, and
    wherein the first ball joint further comprises a first sliding surface between the first ball part and the first ball rack.

6. The pulley wheel rack according to claim 5, wherein the first sliding surface of the first ball joint and the second sliding surface of the second ball joint are configured to form spherical caps of a theoretical sphere whose centre point is the centre point of the axle.

7. The pulley wheel arrangement according to claim 6, wherein the axle extends through the first frame via a first axle opening, and extends through the second frame via a second axle opening, and the axle is rotatably movable via the sliding surface along a three-dimensional path defined by the theoretical sphere and by diameters of the first axle opening of the first frame and the second axle opening of the second frame.

8. The pulley wheel rack according to claim 5, wherein the first adjuster and the second adjuster are configured to communiate with the axle.

9. The pulley wheel rack according to claim 8, wherein the first and second adjusters are vertical adjusters for adjusting the tilt angle of the axle, and the first frame and the second frame both are further provided with at least one horizontal adjuster for adjusting a toe angle of the axle.

10. A method for aligning a pulley wheel in the pulley wheel rack according to claim 1, the method comprising the steps of:
    arranging the pulley wheel axle to extend from the first frame to the second frame;
    arranging the first ball joint and a tightener into the first frame and the second frame;
    rotating the axle with the ball joint into a desired position along a three-dimensional path to a desired position; and
    securing the axle into the desired position with the tightener.

11. The method according to claim 10, wherein the tilt angle is adjusted by moving the axle in a direction of an axis z with at least one vertical adjuster arranged to the first frame and/or to the second frame, the axis z corresponding to a vertical direction.

12. The method according to claim 10, wherein the toe angle is adjusted by moving the axle in a direction of an axis y with at least one horizontal adjuster arranged to the first frame and/or to the second frame, the axis y corresponding to a direction in a plane with and perpendicular to a horizontal direction.

13. The method according to claim 11, wherein the axle extends through the first frame via a first axle opening, and extends through the second frame via a second axle opening, and a maximum tilt angle and/or toe angle is defined by a diameter of the first and second axle openings of the first frame and the second frame.

14. An elevator comprising at least one pulley wheel in the pulley wheel rack according to claim 1.

15. The pulley wheel rack according to claim 2, wherein the first ball joint further comprises a first sliding surface between the first ball part and the first ball rack.

16. The pulley wheel rack according to claim 3, wherein the first ball joint further comprises a first sliding surface between the first ball part and the first ball rack.

17. The pulley wheel rack according to claim 4, wherein the first ball joint further comprises a first sliding surface between the first ball part and the first ball rack.

18. The pulley wheel rack according to claim 2, wherein the first frame and the second frame both comprise at least one adjuster configured to communiate with the axle.

19. The pulley wheel rack according to claim 3, wherein the first frame and the second frame both comprise at least one adjuster configured to communiate with the axle.

* * * * *